United States Patent
Shiraishi et al.

(10) Patent No.: US 9,411,418 B2
(45) Date of Patent: Aug. 9, 2016

(54) DISPLAY DEVICE, DISPLAY METHOD, AND PROGRAM

(71) Applicant: NTT DOCOMO, INC., Tokyo (JP)

(72) Inventors: Seiji Shiraishi, Tokyo (JP); Haruhiko Sugisaki, Tokyo (JP); Hitoshi Yamazaki, Tokyo (JP); Daisuke Suzuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/405,883

(22) PCT Filed: Jun. 3, 2013

(86) PCT No.: PCT/JP2013/065411
§ 371 (c)(1),
(2) Date: Dec. 5, 2014

(87) PCT Pub. No.: WO2013/190989
PCT Pub. Date: Dec. 27, 2013

(65) Prior Publication Data
US 2015/0185833 A1    Jul. 2, 2015

(30) Foreign Application Priority Data
Jun. 22, 2012  (JP) ................................ 2012-140818

(51) Int. Cl.
*G06F 3/01*     (2006.01)
*G06F 3/0488*  (2013.01)
(Continued)

(52) U.S. Cl.
CPC ................ *G06F 3/013* (2013.01); *G06F 3/002* (2013.01); *G06F 3/0485* (2013.01); *G06F 3/0488* (2013.01); *G06F 2203/0381* (2013.01)

(58) Field of Classification Search
CPC ..... G06F 3/013; G06F 3/0485; G06F 3/0488; G06F 2203/0381; G06F 3/0482
See application file for complete search history.

(56) References Cited

U.S. PATENT DOCUMENTS 5,850,211 A * 12/1998 Tognazzini ............. G06F 3/013
345/158
6,111,580 A *  8/2000 Kazama .................. G06F 3/011
340/575

(Continued)

FOREIGN PATENT DOCUMENTS

JP            200299386 A1    9/2000

OTHER PUBLICATIONS

PCT International Search Report issued in International Application No. PCT/JP2013/065411, date mailed Jul. 30, 2013, pp. 1-2.

(Continued)

*Primary Examiner* — Sanjiv D Patel
(74) *Attorney, Agent, or Firm* — MKG, LLC (57) ABSTRACT

Information-processing device detects a visual line of a user, and displays cursor at the position viewed by the user. If the user touches a display area of an image using his/her finger while cursor is close to an edge of the display area, the position touched by the finger is recorded. When the user moves the finger, a scrolling speed is determined according to a distance the finger is moved and the image is scrolled in the direction of cursor. In a case where the position viewed by the user and a scrolling direction change, and where a line of a scrolling direction before the change crosses a line of a scrolling direction after the change, the scrolling direction changes while the scrolling speed is maintained.

4 Claims, 6 Drawing Sheets

(51) Int. Cl.
*G06F 3/0485* (2013.01)
*G06F 3/00* (2006.01)

(56) References Cited

U.S. PATENT DOCUMENTS

| | | | | |
|---|---|---|---|---|
| 8,589,977 | B1* | 11/2013 | Frusciano | H04N 5/44543 715/785 |
| 2007/0040799 | A1* | 2/2007 | Singh | G06F 3/013 345/156 |
| 2009/0237371 | A1 | 9/2009 | Kim et al. | |
| 2010/0283722 | A1 | 11/2010 | Thorn | |
| 2011/0175932 | A1* | 7/2011 | Yu | G06F 3/048 345/661 |
| 2012/0256967 | A1* | 10/2012 | Baldwin | G06F 3/013 345/684 |
| 2012/0272179 | A1* | 10/2012 | Stafford | G06F 3/012 715/781 |
| 2012/0280930 | A1* | 11/2012 | Jang | G06F 3/0485 345/173 |
| 2013/0191711 | A1* | 7/2013 | Tashman | G06F 17/241 715/205 |

OTHER PUBLICATIONS

Extended European Search Report for EP Application No. 1380780736-1959 / 2866132 PCT/JP2013065411, dated Nov. 4, 2015.

\* cited by examiner

DISPLAY DEVICE, DISPLAY METHOD, AND PROGRAM

TECHNICAL FIELD

The present invention relates to a user interface.

BACKGROUND ART

JP2002-99386A1 discloses a system for scrolling a screen by using a visual line of a user. The system detects a direction of a visual line of a user based on an image captured by a camera, and detects a position on a screen of a display device being viewed by the user. When the visual line reaches an edge of the screen, a scroll arrow is displayed on the edge of the screen, and when the visual line moves out of the screen after the scroll arrow is displayed, the screen is scrolled.

In the system of JP2002-99386A1, when a visual line is moved and a position of an edge of the screen being viewed changes, scrolling of an image stops. For example, when a large image (such as a map) is displayed and a position a user wishes to view is approaching, a user scrolls an image minutely from vertically to horizontally or from horizontally to vertically to display the desired position. However, in the system of JP2002-99386A1, each time a direction of view changes, scrolling of an image is stopped, which requires time to scroll to the desired position.

SUMMARY

The present invention has been made in view of the foregoing background, and an object of the present invention is to shorten a required time to display a desired position when scrolling an image by moving a visual line.

An aspect of the present invention provides a display device, comprising: a display unit having a display surface on which an image is displayed; a first detecting unit that detects a visual line of a user; a second detecting unit that detects an operation of the user performed on the display surface; a direction determining unit that determines a scrolling direction of the image according to the visual line detected by the first detecting unit; a speed determining unit that determines a scrolling speed of the image according to the operation detected by the second detecting unit; and a display control unit that controls the display unit to scroll the image in the scrolling direction, and when the scrolling direction changes and a line of a scrolling direction before the change crosses a line of a scrolling direction after the change, starts to scroll the image at the same scrolling speed as that before the scrolling direction changed, and when the scrolling direction after the change is in an opposite direction along a line of the scrolling direction before the change, starts to scroll the image at a predetermined speed or stops scrolling the image, and when the scrolling speed changes as a result of an input operation by the user, scrolls the image at a scrolling speed according to the input operation.

In a preferred aspect of the present invention, the display control unit, when the visual line moves in a predetermined area of the display surface and then moves in a direction before the movement, starts to scroll the image at a scrolling speed faster than that before the visual line moved in the predetermined area.

Another aspect of the present invention provides a display method, comprising the steps of: detecting a visual line of a user; detecting an operation of the user operated on a display surface of a display unit that displays an image; determining a scrolling direction of the image according to the detected visual line; determining a scrolling speed of the image according to the detected operation; and controlling the display unit to scroll the image in the scrolling direction, and when the scrolling direction changes and a line of a scrolling direction before the change crosses a line of a scrolling direction after the change, starts to scroll the image at the same scrolling speed as that before the scrolling direction changed, and when the scrolling direction after the change is in an opposite direction along a line of the scrolling direction before the change, starts to scroll the image at a predetermined speed or stops scrolling the image, and when the scrolling speed changes as a result of an input operation by the user, scrolls the image at a scrolling speed according to the input operation.

Another aspect of the present invention provides a program for causing a computer to execute the steps of: detecting a visual line of a user; detecting an operation of the user performed on a display surface of a display unit that displays an image; determining a scrolling direction of the image according to the detected visual line; determining a scrolling speed of the image according to the detected operation; and controlling the display unit to scroll the image in the scrolling direction, when the scrolling direction changes and a line of a scrolling direction before the change crosses a line of a scrolling direction after the change, starts to scroll the image at the same scrolling speed as that before the scrolling direction changed, and when the scrolling direction after the change is in an opposite direction along a line of the scrolling direction before the change, starts to scroll the image at a predetermined speed or stops scrolling the image, and when the scrolling speed changes as a result of an input operation by the user, scrolls the image at a scrolling speed according to the input operation.

According to the present invention, a required time to display a desired position is shortened when an image is scrolled by moving of a visual line.

DETAILED DESCRIPTION

Embodiment

Hardware Configuration

Figure 1:
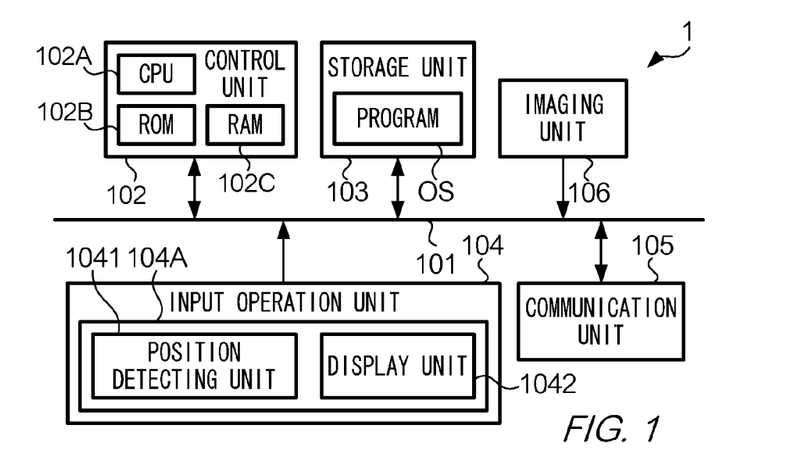
FIG. 1 is a diagram showing a hardware configuration of information-processing device 1.

FIG. 1 is a diagram showing a hardware configuration of information-processing device 1 according to an embodiment of the present invention. Information-processing device 1 according to the present embodiment is a computer device including a touch screen and hardware buttons, which is referred to as a "tablet terminal." The touch screen and the hardware buttons are provided in a plate-like housing. Information-processing device 1 is an example of a display device that displays an image on a touch screen. The components of information-processing device 1 are interconnected via bus 101, as shown in FIG. 1.

Communication unit 105 has a function of a communication interface that performs wireless communication. Information-processing device 1 controls communication unit 105 to connect to a wireless LAN (Local Area Network) or a mobile communication network, via which the device performs data or voice communication.

Input operation unit 104 includes plural hardware buttons for operating information-processing device 1. Input operation unit 104 also includes touch screen 104A, in which display unit 1042 and position detecting unit 1041 are integrated. Display unit 1042 is an example of a display means for displaying an image. Position detecting unit 1041 is provided on a surface of display unit 1042. Position detecting unit 1041 transmits an image displayed by display unit 1042, and detects a position touched by a finger. Display unit 1042 may be a liquid crystal display, an organic EL (Electro Luminescence) display, or any other display. Position detecting unit 1041 may be a sensor such as a capacitance type sensor, which detects positions touched by more than one finger. While a user's finger touches touch screen 104A, position detecting unit 1041 generates position data representing a position touched by a finger, and provides generated position data to control unit 102.

Imaging unit 106 includes a lens and a solid-state imaging sensor, and generates data representing an image formed in the solid-state imaging sensor by the lens.

Storage unit 103 includes a non-volatile memory. Storage unit 103 stores program OS for providing an operating system, and a variety of application programs. Control unit 102 includes CPU (Central Processing Unit) 102A, ROM (Read Only Memory) 102B, and RAM (Random Access Memory) 102C. When CPU 102A executes an IPL (Initial Program Loader) stored in ROM 102B, program OS stored in storage unit 103 is executed so that the operating system is loaded. As a result, the variety of application programs becomes executable. In the present embodiment, after the operating system is provided, a user interface using touch screen 104A and imaging unit 106 is provided.

(Description of Functional Block)

Figure 2:
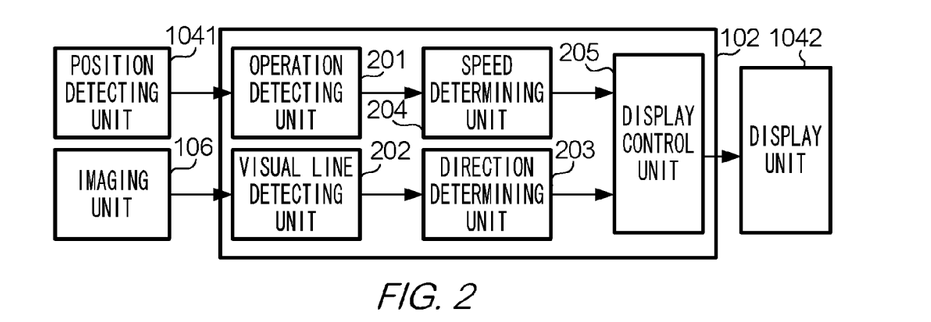
FIG. 2 is a block diagram showing functions of information-processing device 1.

FIG. 2 is a block diagram showing functions provided by control unit 102, which relates to characteristics of the present invention. In the present embodiment, a user interface is provided with touch screen 104A and imaging unit 106, as described above. FIG. 2 is a block diagram showing functions relevant to the user interface function.

Operation detecting unit 201 acquires position data generated in position detecting unit 1041. The position data indicates a position on a display surface of display unit 1042, which has been touched by a user's finger. A content of position data is changed when the user's finger moves. Operation detecting unit 201 detects an operation performed via the user's finger based on the position data.

Visual line detecting unit 202 detects a user's visual line. Visual line detecting unit 202 acquires an image showing a user's face. Visual line detecting unit 202 detects a user's visual line based on the acquired image of the user's face.

Direction determining unit 203 determines a scrolling direction in a case of scrolling an image based on the visual line detected by visual line detecting unit 202.

Speed determining unit 204 determines a scrolling speed in a case of scrolling an image according to the operation performed by operation detecting unit 201. For example, when an operation in which a finger moves on touch screen 104A is performed, speed determining unit 204 determines a scrolling speed according to a distance from a touched position to a position after the movement of a finger.

Display control unit 205 controls display unit 1042 to scroll an image. Display control unit 205 scrolls an image using the scrolling direction determined by direction determining unit 203 and the scrolling speed determined by speed determining unit 204.

Example Operation of Embodiment

Figure 4:
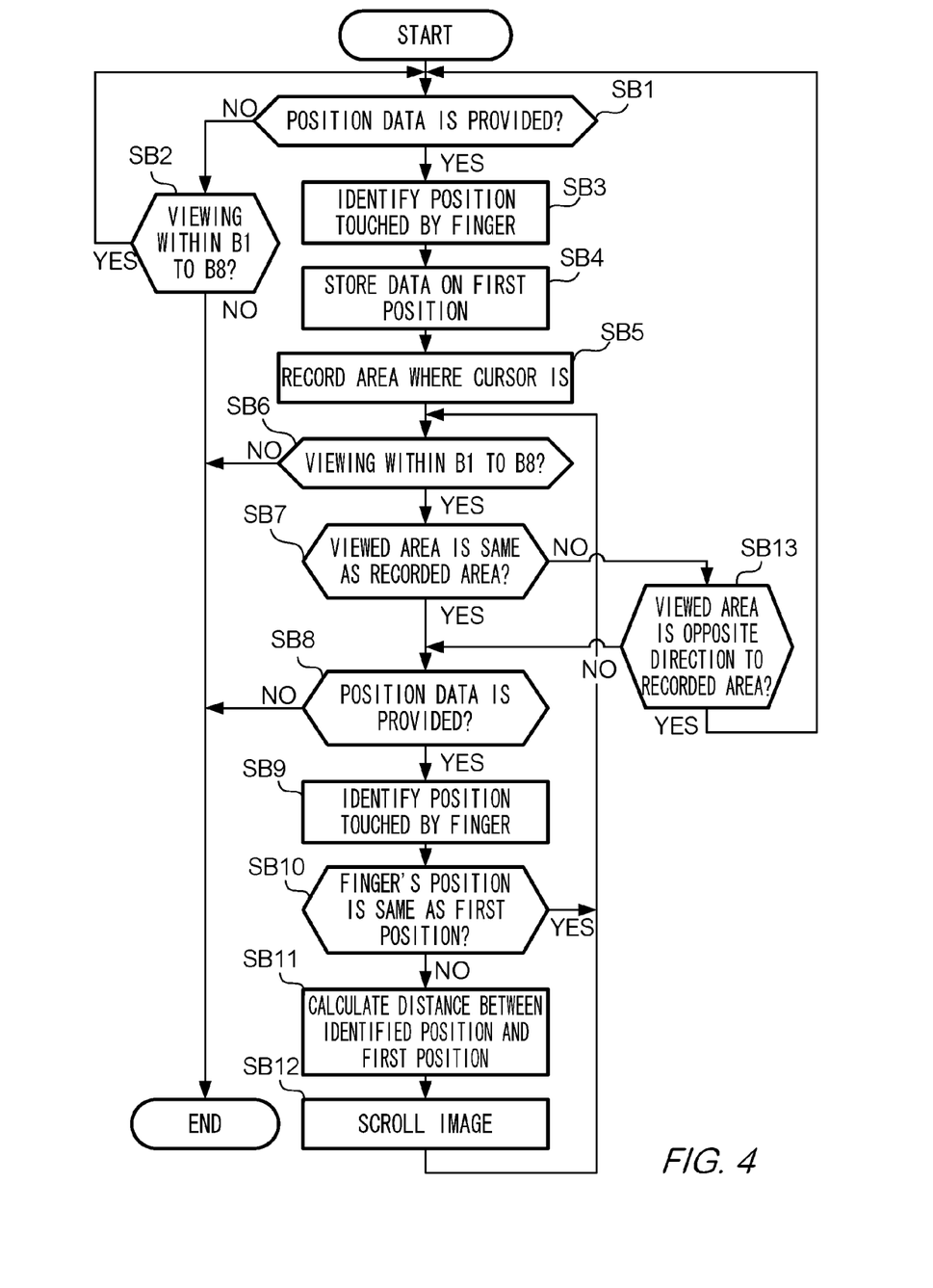
FIG. 4 is a flowchart showing a flow of processing performed by control unit 102.
Figure 5:
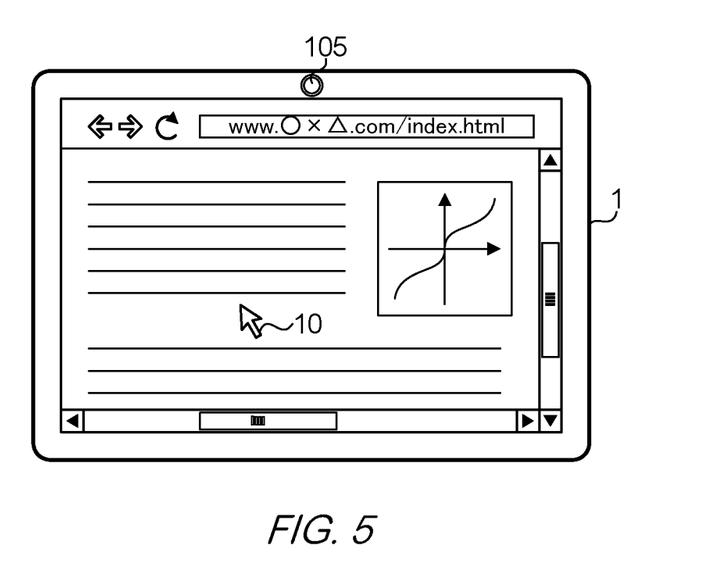
FIG. 5 is a diagram showing an example of a screen image displayed on display unit 1042.
Figure 6:
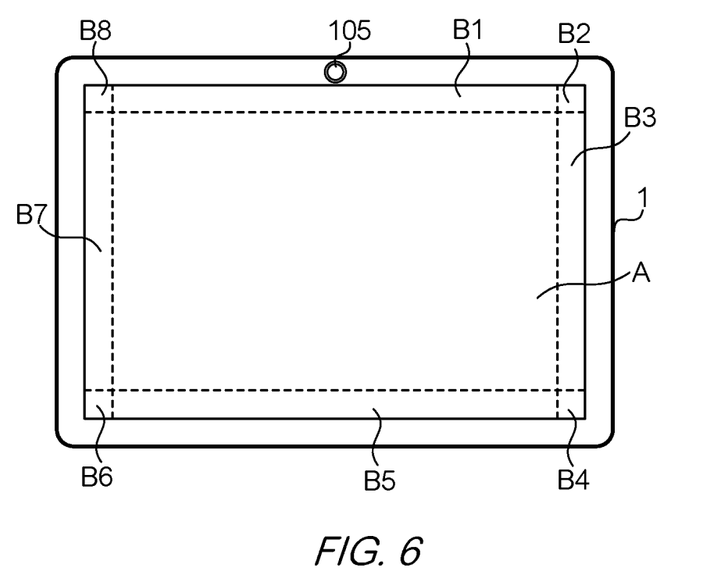
FIG. 6 is a diagram showing an example of a screen image displayed on display unit 1042.

An example of an operation of the present embodiment will be described with reference to flowcharts shown in FIGS. 3 and 4, and example screen images shown in FIGS. 5 to 10. FIG. 5 shows an example of a screen image displayed when information-processing device 1 executes an application program that realizes a web browser. The screen image displayed is a web page selected by a user.

Control unit 102 controls imaging unit 106 to capture an image. When the user looks at the display screen, imaging unit 106 captures an image of the user's face. Imaging unit 106 generates an image representing the user's face (hereinafter referred to as "face image").

Figure 3:
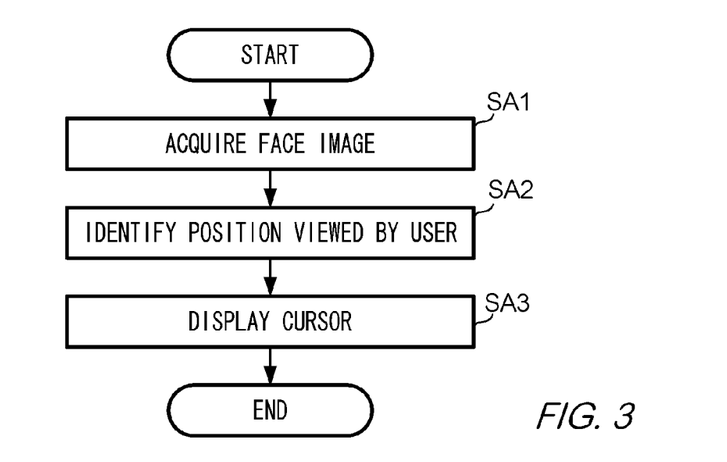
FIG. 3 is a flowchart showing a flow of processing performed by control unit 102.

Control unit 102 executes the process shown in FIG. 3 each time a face image is generated. First, control unit 102 acquires the face image (step SA1). After acquiring the face image, control unit 102, using, for example, a technique disclosed in JP 10-39995 A, detects a visual line of the user to identify a position on the display screen viewed by the user (step SA2). It is to be noted that the technique for detecting a user's visual line may be any other conventional technique. For example, a user's visual line may be detected based on an image of the user's eyes captured by a camera mounted on the user's head.

After identifying the position viewed by the user, control unit 102 controls display unit 1042 to display cursor 10 at the identified position (step SA3). When the processing of step SA3 is carried out, cursor 10 is displayed at the position viewed by the user as shown in FIG. 5.

To scroll the displayed web page, the user moves his/her visual line toward an edge of the rectangular display area of display unit 1042. Control unit 102 identifies the position viewed by the user using the face image captured by imaging unit 106, and moves cursor 10 to the identified position. After moving cursor 10, control unit 102 determines whether the position viewed by the user moves to any one of areas B1 to B8 shown in FIG. 6.

When the position viewed by the user moves from area A (shown in FIG. 6) to any one of areas B1 to B8, control unit 102 determines whether the user's finger is in contact with touch screen 104A. If the position data is not provided by touch screen 104A when the position viewed by the user moves from area A to any one of areas B1 to B8 (step SB1; NO), control unit 102 determines whether the position viewed by the user is within any one of areas B1 to B8. If the position viewed by the user is out of any one of areas B1 to B8, such as area A or out of the display area of display unit 1042 (step SB2; NO), control unit 102 ends the process shown in FIG. 4.

On the other hand, In a case where the positive determination is made at step SB1, control unit 102 identifies, using the acquired position data, a position touched by the user's finger on the display screen (step SB3). Control unit 102 stores data on the position (hereinafter referred to as "first position") identified at step SB3 in RAM 102C (step SB4). Control unit 102 records the area after the movement when the position has moved from area A to any one of areas B1 to B8 (step SB5).

Next, control unit 102 determines whether the position viewed by the user is any one of areas B1 to B8. If the position viewed by the user is not any one of areas B1 to B8 (step SB6; NO), control unit 102 ends the process shown in FIG. 4. On the other hand, if the position viewed by the user is any one of areas B1 to B8 (step SB6; YES), control unit 102 determines that the area viewed by the user at that time is the same as the area recorded at step SB5. If the area viewed by the user at that time differs from the area recorded at step SB5 (step SB7; NO), control unit 102 returns to step SB1.

On the other hand, in a case where the positive determination is made at step SB7, control unit 102 determines whether position data is provided. If position data is not provided (step SB8; NO), control unit 102 determines that the finger is disengaged from the touch screen and ends the process shown in FIG. 4.

In a case where the positive determination is made at step SB8, control unit 102 identifies the position of the user's finger from the position data (step SB97), and determines whether the position of the user's finger is the same as the first position. If the position identified at step SB9 is the same as the first position (step SB10; YES), control unit 102 returns to step SB6.

Alternatively, if the position identified at step SB9 differs from the first position (step SB10; NO), control unit 102 determines that the position of the user's finger has changed from the first position. When the position of the user's finger has changed, control unit 102 calculates the distance between the position identified at step SB9 and the first position (step SB11).

Figure 7:
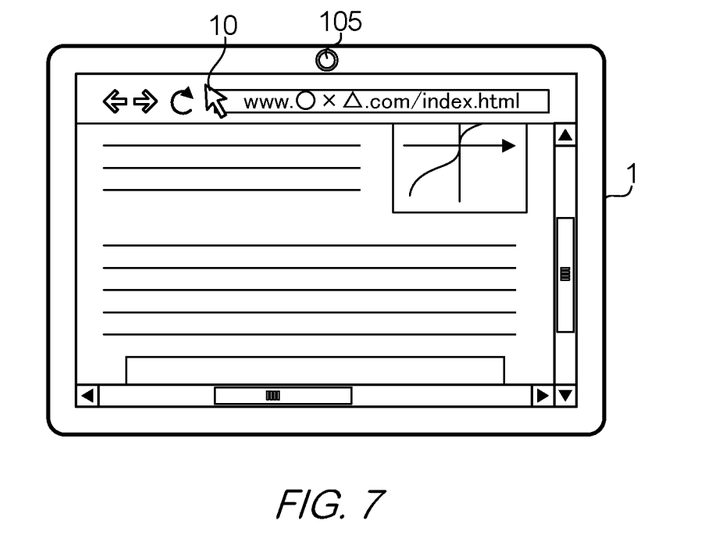
FIG. 7 is a diagram showing an example of a screen image displayed on display unit 1042.
Figure 8:
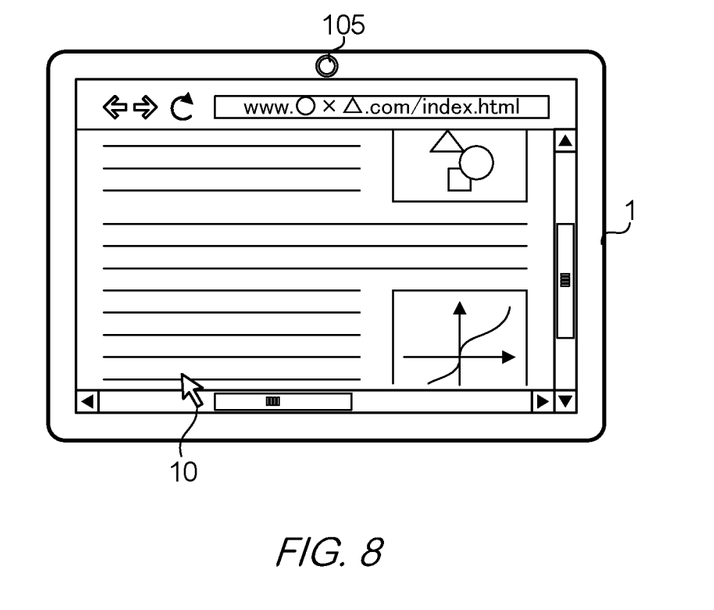
FIG. 8 is a diagram showing an example of a screen image displayed on display unit 1042.
Figure 9:
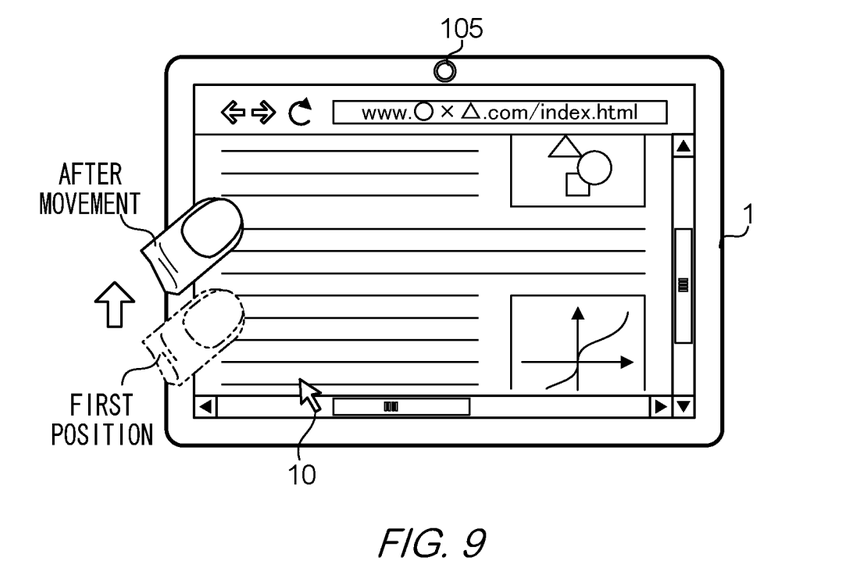
FIG. 9 is a diagram showing an example of a screen image displayed on display unit 1042.
Figure 10:
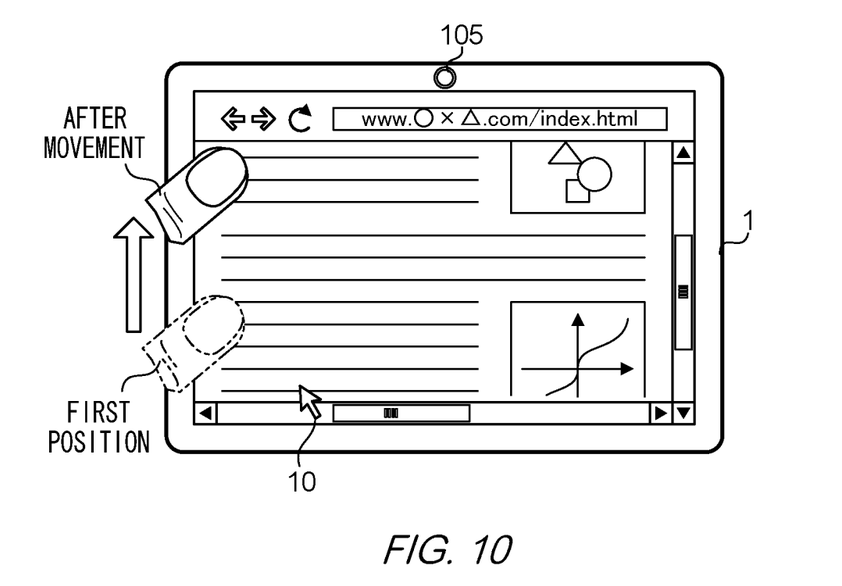
FIG. 10 is a diagram showing an example of a screen image displayed on display unit 1042.

After calculating the distance at step SB11, control unit 102 scrolls the image displayed according to the position of cursor 10 and the calculated distance (step SB12). Specifically, control unit 102 scrolls the image in the direction of the area of existing cursor 10. For example, when cursor 10 moves from the position shown in FIG. 5 to area B1 to scroll a displayed image, the image is scrolled toward area B1, as shown in FIG. 7. Alternatively, when cursor 10 moves from the position shown in FIG. 5 to area B5 to scroll a displayed image, the image is scrolled toward area B5, as shown in FIG. 8. It is to be noted that the finger in contact with touch screen 104A is not shown in FIGS. 7 and 8. Further, control unit 102 sets a scrolling speed (an amount of movement per unit time (for example, one second)) of an image according to the distance calculated at step SB11. For example, control unit 102 makes the scrolling speed faster as the distance calculated at step SB11 becomes longer. Therefore, as shown in FIG. 9, when a finger moves from the first position, if the position of the finger after the movement is close to the first position, the scrolling speed decelerates, and the scrolling speed accelerates as the position of the finger after the movement becomes more distant from the first position. Consequently, as shown in FIG. 10, when the position after the movement is farther from the first position than the position shown in FIG. 9, the scrolling speed for the case of FIG. 10 is faster than in the case of FIG. 9.

After the processing of step SB12, control unit 102 returns to step SB6. And then, if the user views a point outside of areas B1 to B8, or the user's finger is disengaged from touch screen 104A, control unit 102 finishes scrolling the image.

If the area viewed by the user changed from the area recorded at step SB5 while scrolling the image, control unit 102 makes the negative determination at step SB7.

Subsequently, control unit 102 determines whether the area viewed by the user is the area of the opposite direction to the area recorded at step SB5. For example, when the visual line moves from area B1 to B5, from area B5 to B1, from area B3 to B7, and from area B7 to B3, control unit 102 determines that the area viewed by the user is the area in the opposite direction to the area recorded at step SB5 (step SB13; YES), and returns to step SB1.

When control unit 102 makes the positive determination at step SB13 and returns to step SB1, the position of the user's finger at that time is recorded as the first position. Control unit 102 does not scroll the image until the finger moves from the first position. Accordingly, scrolling of an image is stopped when a moving direction of a visual line has changed to an opposite direction during scrolling of the image. Subsequently, when the finger has moved from the new first position, the image is scrolled according to the distance from the first position, which is stored when the visual line has moved to the position of the finger after the movement.

On the other hand, when control unit 102 makes the negative determination at step SB13, control unit 102 returns to step SB8. In this case, the scrolling speed is set according to the distance from the first position to the position of the finger. Therefore, the scrolling speed is the same and the scrolling direction changes as compared to that before movement of the visual line. For example, when the visual line moves from area B1 to area B7, the scrolling direction changes to the direction of area B7 while maintaining the scroll speed when the visual line faces to area B1.

According to the present embodiment, it is possible to determine a scrolling direction of an image by a user's visual line and control a scrolling speed by an operation of a user's finger. In addition, according to the present embodiment, scrolling of an image is stopped as a user moves his/her visual line to the opposite direction while scrolling the image. Therefore, it is possible to display the desired position of a user easily, as compared to the case where a scrolling direction is changed to the opposite direction while maintaining the scrolling speed.

[Modifications]

The present invention may be implemented in embodiments other than that described above. For example, the above embodiment may be modified as described below. The above embodiment and the following modifications may be combined with each other.

In the above embodiment, an image is scrolled while a visual line is in any of areas B1 to B8; however, a position of a visual line for scrolling an image is not limited to these areas. An image may be scrolled while a visual line moves to the outside of the display area of display unit 1042.

Figure 11:
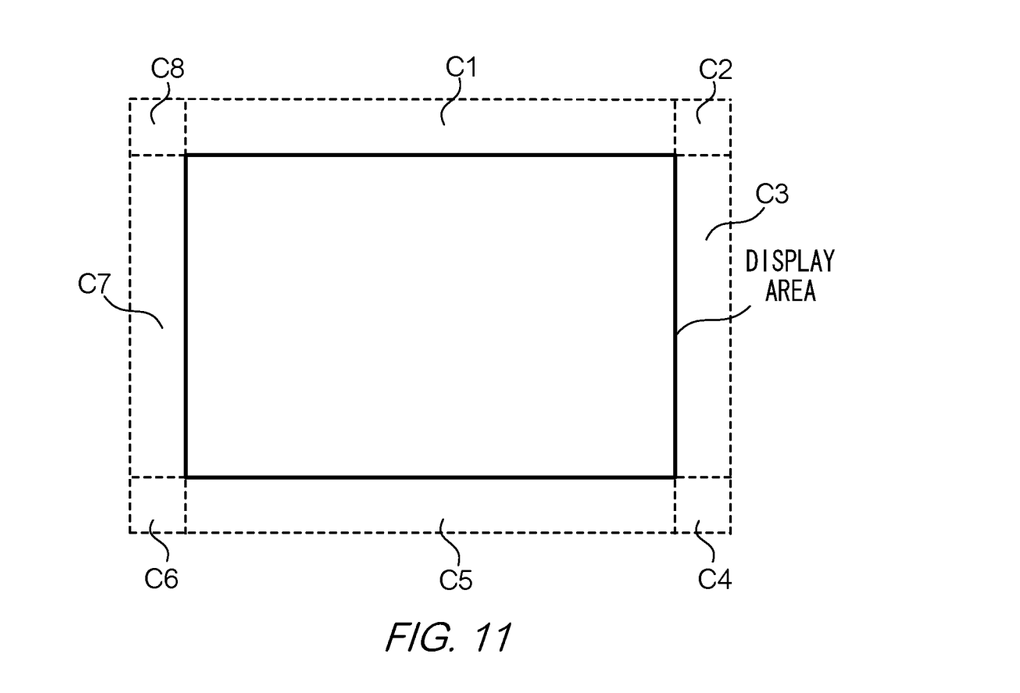
FIG. 11 is a diagram showing an area viewed by a user while scrolling an image.

For example, in a case where there is a display area of an image shown by a dashed line in FIG. 11, the image may be scrolled while a visual line is in areas C1 to C8 (that is, the outside of the display area), instead of areas B1 to B8.

Figure 12:
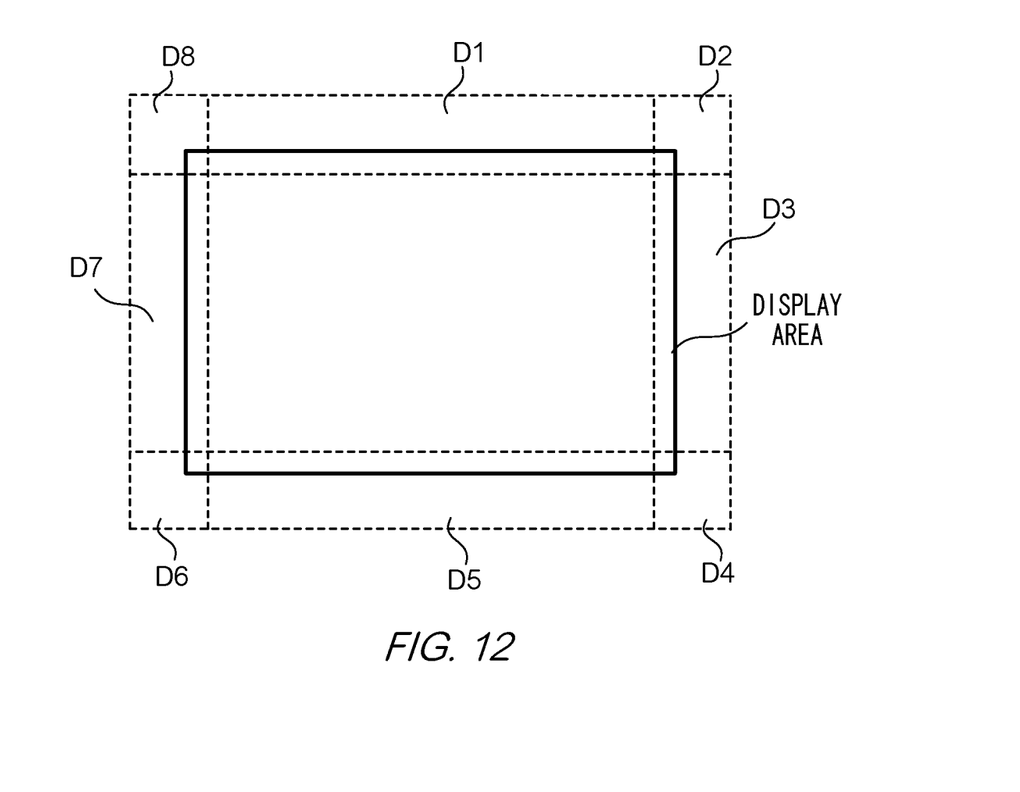
FIG. 12 is a diagram showing an area viewed by a user while scrolling an image.

Alternatively, in a case where there is a display area of an image shown by a dashed line in FIG. 12, the image may be scrolled while a visual line is in areas D1 to D8 shown in FIG. 12, instead of areas B1 to B8.

In the above embodiment, a scrolling speed of an image is determined according to an amount of movement. However, a method for determining a scrolling speed is not limited to the method of the above embodiment.

For example, there is a touch screen that is able to measure pressure applied by a finger. In this case, a scrolling speed of an image may be accelerated as pressure applied by a finger increases.

Additionally, when a user touches a touch screen using his/her finger after s/he has moved his/her visual line to any of areas B1 to B8, a scrolling speed of an image may be accelerated as elapsed time during which the finger touches the touch screen increases.

Alternatively, when a user taps a touch screen using his/her finger after s/he has moved his/her visual line to any of areas B1 to B8, a scrolling speed of an image may be accelerated as a number of taps on a touch screen increases.

In the above embodiment, scrolling of an image stops if a user moves his/her visual line. Subsequently, to scroll the image again, the user has to move his/her finger after moving the visual line. However, if the visual line returns to the position viewed by the user before stopping the scrolling, the operation may be carried out as described below.

For example, when the position viewed by the user moves from any of areas B1 to B8 to area A, control unit 102 stores data on the area viewed by the user before moving to area A and the scrolling speed before the position was moved to area A. Next, when the position viewed by the user returns to the stored area without disengaging his/her finger from touch screen 104, control unit 102 scrolls the image in the direction viewed by the user at a speed faster than the stored speed. Alternatively, when the position viewed by the user does not return to the stored area and moves to the other position, control unit 102 stores data on the new first position and stops scrolling the image until the position of the finger is moved.

According to the present modification, where a scrolling of an image is not stopped while the scrolling is continuously carried out in the same direction, a user is able to scroll an image faster than in a case where the scrolling is stopped.

In the above embodiment, scrolling of an image is stopped when a visual line moves in the opposite direction to a scrolling direction after recording the first position; however, control unit 102 may not be provided with such a configuration. For example, when a visual line moves from area B1 to area B5, control unit 102 records the position of a finger at the time a visual line moves to area B5 as a first position, and scrolls an image in the direction of area B5 at a predetermined speed. Additionally, as the finger moves further from the first position, control unit 102 may make the scrolling speed faster according to a distance from the first position to the position of the finger, using the predetermined speed as a benchmark.

In the above embodiment, a scrolling speed may vary for different applications or contents to be displayed. For example, a scrolling speed where a web page is displayed by a web browser may vary from a scrolling speed where a document is displayed by a word processor application, even though an amount of a movement of a finger from the first position is the same. In addition, a scrolling speed where a text page is displayed by a web browser may vary from a scrolling speed where a map page displayed by the web browser.

In the above embodiment, a function of scrolling an image according to a finger's position and a visual line is provided by executing an operating system program.

However, the function may be provided by executing another program such as an application program, instead of the operating system program.

In the above embodiment, imaging unit 106 is built into information-processing device 1; however, imaging unit 106 may not be built into information-processing device 1. For example, a camera having a lens and a solid-state imaging sensor may be connected to information-processing device 1, and an image of a user's face may be captured using the camera. The camera may be mounted on an eyeglass frame, and an image of a user's face may be captured using the camera.

In the above embodiment, information-processing device 1 is provided with a function of performing communication using a communication network; however, information-processing device 1 may not be provided with such a function. For example, information-processing device 1 may be an electronic book reader.

A program for providing functions described in the foregoing embodiments may be provided in the form of a computer-readable recording medium to be installed in information-processing device 1. The recording medium may be a magnetic recording medium, an optical recording medium, a magneto-optical recording medium, or a semiconductor memory. The magnetic recording medium may be a magnetic tape, or a magnetic disk such as an HDD (Hard Disk Drive) or an FD (Flexible Disk). The optical recording medium may be an optical disk. The program may be downloaded to information-processing device 1 via a communication line to be installed in information-processing device 1.

The invention claimed is:

1. A display device, comprising:
   a display unit having a display surface on which an image is displayed;
   a first detecting unit that detects a visual line of a user;
   a second detecting unit that detects an operation performed by the user on the display surface;
   a direction determining unit that determines a scrolling direction of the image according to the visual line detected by the first detecting unit;
   a speed determining unit that determines a scrolling speed of the image according to the operation detected by the second detecting unit; and
   a display control unit that controls the display unit to scroll the image in the scrolling direction, when the visual line moves from a place outside of a predetermined area of the display unit to a location within the predetermined area, the image commences scrolling at the scrolling speed, wherein the scrolling speed is maintained when the visual line is moved from the predetermined area to the place outside of the predetermined area, and when the visual line moves from a first position within the predetermined area to a second position such that a movement to the second position is in an opposite direction as the scrolling direction, the image scrolling is stopped or scrolled at a predetermined speed, and when the scrolling speed changes as a result of an input operation by the user, the image is scrolled at a second scrolling speed according to the input operation.

2. The display device according to claim 1, wherein the display control unit, when the visual line moves from the first position within the predetermined area to the second position such that a movement to the second position is in an opposite direction as the scrolling direction the image starts to scroll at a third scrolling speed, the third scrolling speed being faster than the scrolling speed before the visual line in the predetermined area was moved.

3. A display method, comprising the steps of:
- detecting a visual line of a user;
- detecting an operation performed by the user on a display surface of a display unit that displays an image;
- determining a scrolling direction of the image according to the detected visual line;
- determining a scrolling speed of the image according to the detected operation; and
- controlling the display unit to scroll the image in the scrolling direction, when the visual line moves from a place outside of a predetermined area of the display unit to a location within the predetermined area, the image commences scrolling at the scrolling speed, wherein the scrolling speed is maintained when the visual line is moved from the predetermined area to the place outside of the predetermined area, and when the visual line moves from a first position within the predetermined area to a second position such that a movement to the second position is in an opposite direction as the scrolling direction, the image scrolling is stopped or scrolled at a predetermined speed, and when the scrolling speed changes as a result of an input operation by the user, the image is scrolled at a second scrolling speed according to the input operation.

4. A program stored on a non-transitory computer readable medium for causing a computer to execute the steps of:
- detecting a visual line of a user;
- detecting an operation performed by the user on a display surface of a display unit that displays an image;
- determining a scrolling direction of the image according to the detected visual line;
- determining a scrolling speed of the image according to the detected operation; and
- controlling the display unit to scroll the image in the scrolling direction, when the visual line moved from a place outside of a predetermined area of the display unit to a location within the predetermined area, the image commences scrolling at the scrolling speed, wherein the scrolling speed is maintained when the visual line is moved from the predetermined area to the place outside of the predetermined area, and when the visual line moves from a first position within the predetermined area to a second position such that a movement to the second position is in an opposite direction as the scrolling directed, the image scrolling is stopped or scrolled at a predetermined speed, and when the scrolling speed changes as a result of an input operation by the user, the image is scrolled at a second scrolling speed according to the input operation.

* * * * *